(12) United States Patent
Matsuzawa et al.

(10) Patent No.: US 6,262,723 B1
(45) Date of Patent: Jul. 17, 2001

(54) SYSTEM FOR USE IN MULTIMEDIA EDITOR FOR DISPLAYING ONLY AVAILABLE MEDIA RESOURCES TO FACILITATE SELECTION

(75) Inventors: Tomoko Matsuzawa, Tokyo; Toshio Oka, Yokohama; Makoto Sato, Funabashi, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/200,870

(22) Filed: Nov. 27, 1998

(30) Foreign Application Priority Data

Nov. 28, 1997 (JP) .................................................. 9-342013

(51) Int. Cl.[7] ...................................................... G06F 3/14
(52) U.S. Cl. ........................................... 345/328; 345/302
(58) Field of Search .................................. 345/328, 326, 345/333, 334, 339, 340, 348, 302, 327; 386/52, 55

(56) References Cited

U.S. PATENT DOCUMENTS

| 5,237,648 | * | 8/1993 | Mills et al. ............................ 345/433 |
| 5,339,393 | * | 8/1994 | Duffy et al. ........................... 345/328 |
| 5,564,004 | * | 10/1996 | Grossman et al. .................... 345/348 |
| 5,659,793 | * | 8/1997 | Escobar et al. ....................... 345/302 |
| 5,732,184 | * | 3/1998 | Chao et al. ............................. 386/55 |
| 5,781,188 | * | 7/1998 | Amiot et al. .......................... 345/328 |
| 5,838,938 | * | 11/1998 | Morgan ................................. 345/328 |
| 5,920,313 | * | 7/1999 | Diedrichsen et al. ................ 345/339 |
| 5,969,716 | * | 10/1999 | Davis et al. .......................... 345/328 |
| 6,031,535 | * | 2/2000 | Barton ................................... 345/354 |

FOREIGN PATENT DOCUMENTS

| 0758115 | 2/1997 | (EP) . |
| 0803825 | 10/1997 | (EP) . |
| 6-119229 | 4/1994 | (JP) . |
| 8-6962 | 1/1996 | (JP) . |
| WO 9428480 | 12/1994 | (WO) . |

* cited by examiner

Primary Examiner—Crescelle N. dela Torre
(74) Attorney, Agent, or Firm—Israel Gopstein (57) ABSTRACT

A multimedia editing system for editing a scenario that defines the details of a multimedia application. The system presents to a user only media materials permitted to situations at a current time in the scenario under editing (a current scenario time) to facilitate a selection of media material. The media materials are divided into a plurality of types. Each of the types may have at least one format, a part of which is supported by the system (supported formats). Each media material is associated with a type, a format and an availability code of the material in a material table. The availability code indicates one of predetermined states of each material. In response to a change in one of situations that affects an availability of materials of a certain type and/or a certain format, the availability code of a material affected by the change is updated such that the availability code of each material reflects a current state of the material. Media materials of the supported formats are displayed in different ways associated with said predetermined states according to said current state of said materials.

19 Claims, 11 Drawing Sheets

SolarSystem.mtbl

| FILE NAME | MEDIA TYPE | FORMAT | FILE SIZE | DISPLAYED NAME | AVAIL. |
|---|---|---|---|---|---|
| SolarSys.mpg | MOVIE | MPEG2 | 466M | Solar System | 2 |
| Kepler.mpg | MOVIE | MPEG1 | 231M | Kepler's Laws | 2 |
| Eclipses.dv | MOVIE | DV | 567M | Solar/Lunar Eclipse | 0 |
| Sun.jpg | STILL | JPEG | 2M | Sun | 1 |
| ⋮ | ⋮ | ⋮ | ⋮ | ⋮ | ⋮ |
| SolarWnd.wav | AUDIO | WAVE | 256k | Solar Wind | 2 |
| Sunspot.wav | AUDIO | WAVE | 128k | Sunspot | 2 |
| Planets.txt | TEXT | TEXT | 32k | Planets | 1 |
| ⋮ | ⋮ | ⋮ | ⋮ | ⋮ | ⋮ |

SolarSystem.mtbl                    20a

| FILE NAME | MEDIA TYPE | FORMAT | FILE SIZE | DISPLAYED NAME | AVAIL. |
|---|---|---|---|---|---|
| SolarSys.mpg | MOVIE | MPEG2 | 466M | Solar System | 3 |
| Kepler.mpg | MOVIE | MPEG1 | 231M | Kepler's Laws | 2 |
| Eclipses.dv | MOVIE | DV | 567M | Solar/Lunar Eclipse | 0 |
| Sun.jpg | STILL | JPEG | 2M | Sun | 2 |
| ⋮ | ⋮ | ⋮ | ⋮ | ⋮ | ⋮ |
| SolarWnd.wav | AUDIO | WAVE | 256k | Solar Wind | 2 |
| Sunspot.wav | AUDIO | WAVE | 128k | Sunspot | 2 |
| Planets.txt | TEXT | TEXT | 32k | Planets | 2 |
| ⋮ | ⋮ | ⋮ | ⋮ | ⋮ | ⋮ |

FIG. 14

SYSTEM FOR USE IN MULTIMEDIA EDITOR FOR DISPLAYING ONLY AVAILABLE MEDIA RESOURCES TO FACILITATE SELECTION

BACKGROUND OF THE INVENTION

1. Field of the Invention

The invention relates to a system for creating and editing a multimedia program which defines the details of a multimedia application, and more particularly, to a method and system for use in such a multimedia editing system for presenting available media resources or materials such as moving videos, still pictures, audios and texts.

2. Description of the Prior Art

A multimedia computer program or a scenario comprises a title name, a running time of the title, a screen layout which defines the windows in which a video, a still picture and a text are displayed, the media materials used in the title, and a schedule for manipulating the media materials. The created scenario is replayed by either the multimedia editing system that created the scenario or any micro-based multimedia player system provided with resources necessary for replaying the scenario.

The media resources or materials are typically used in the following formats for each of the media material types: i.e., MPEG(Moving Picture Experts Group)-1 and -2, AVI (Audio Video Interleave: the file format for Microsoft's video for Windows), and DV formats for the video type; JPEG (Joint Photographic Coding Experts Group), BMP (the standard bit-mapped graphics format used in the Windows environment), and PhotoCD (a file format for storing digital photographs) formats for the still picture type; and MIDI (Musical Instrument Digital Interface) and Wave formats for the audio type. Conventional multimedia editing or authoring systems generally display all of prepared media materials at a time. In editing a multimedia program, the user selects one out of the displayed media materials to assign to a layout window either provided by a prepared template or specified by the user if the selected media material is of a visual type (i.e., any of the video, picture and text types) and to assign to a desired scenario time (or a time measured from the beginning of the scenario) to start replaying the selected material if the selected media material is of the audio type. This process is repeated till a desired scenario is obtained.

However, all the media types of the prepared media materials are not necessarily supported by the multimedia editing system or a multimedia player system on which a scenario being edited is to be played. Even media materials supported in this sense are not always permitted to be used in the course of scenario editing depending on design thought of the multimedia editing system.

It is therefore an object of the invention to provide a method of presenting or displaying only media materials permitted to the current conditions with respect to the window type of a window to which a material is about to be assigned, media types that have been used so far and so on to facilitate the selection of media material.

It is another object of the invention to provide a multimedia editing system which displays only media materials permitted to the current conditions with respect to the window type of a window to which a material is about to be assigned, media types that have been used so far and so on to facilitate the selection of media material.

SUMMARY OF THE INVENTION

According to the invention, there is provided a method of presenting to a user only media materials permitted to situations at a current time in a scenario under editing (hereinafter referred to as a "current scenario time") to facilitate a selection of media material in a system for editing the scenario that defines the details of a multimedia application. The media materials are divided into a plurality of types and wherein each of the types may have at least one format, a part of which is supported by the system and hereinafter referred to as "supported formats." The method comprising the steps of:

storing a material record that associates each media material with a type, a format and an availability code of each material, the availability code indicating one of predetermined states of each material;

in response to a change in one of situations that affects an availability of materials of a certain type and/or a certain format, updating the availability code of a material affected by the change in the situation such that the availability code of each material reflects a current state of each material; and displaying media materials of the supported formats in different ways associated with the predetermined states according to the current state of the materials.

BRIEF DESCRIPTION OF THE DRAWING

Further objects and advantages of the present invention will be apparent from the following description of the preferred embodiments of the invention as illustrated in the accompanying drawing, in which.

Throughout the drawing, the same elements when shown in more than one figure are designated by the same reference numerals.

DETAILED DESCRIPTION OF THE PREFERRED EMBODIMENTS

Figure 1:
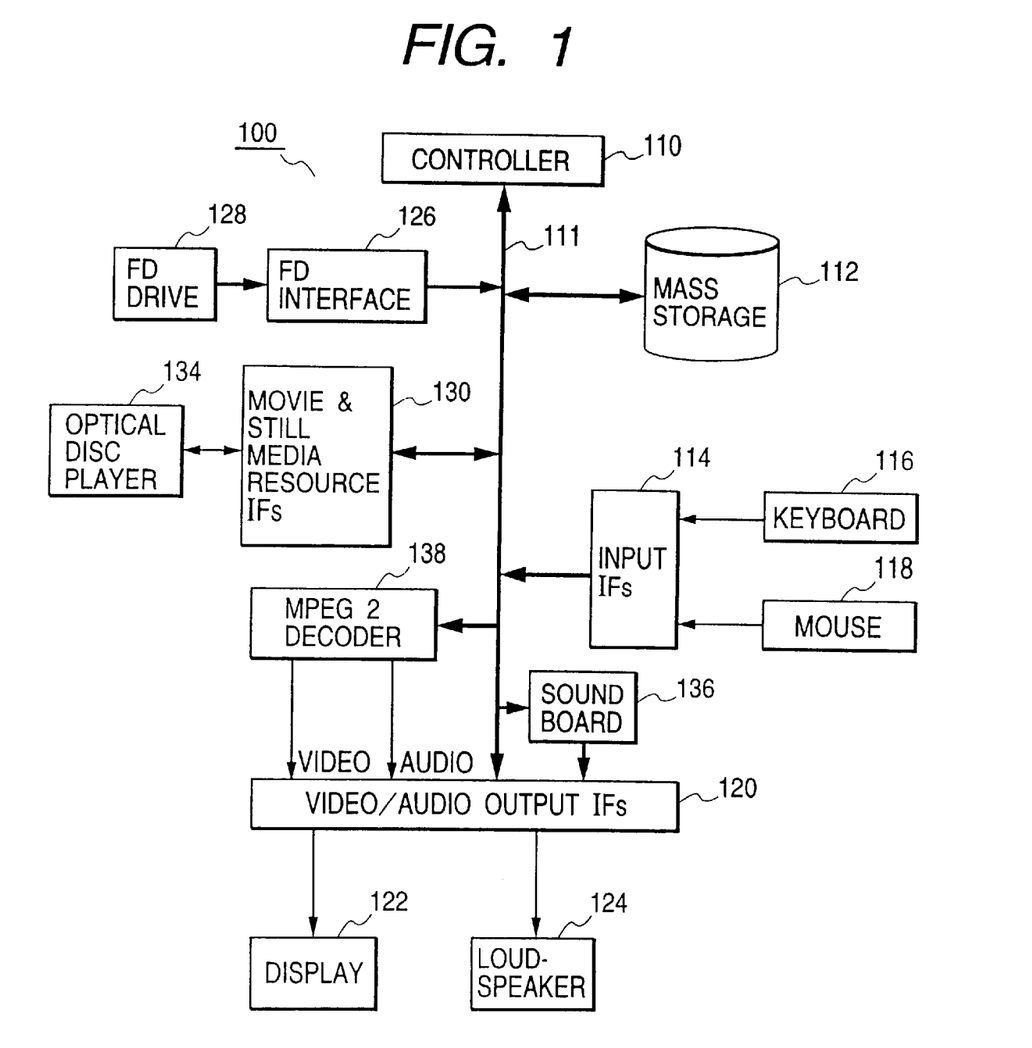
FIG. 1 is a schematic block diagram showing an arrangement of a multimedia editing system 100 according to an illustrative embodiment of the invention.

FIG. 1 is a schematic block diagram showing an arrangement of a multimedia editing system 100 according to an illustrative embodiment of the invention. In FIG. 1, the video editing system 100 is a computer-based system which comprises a controller 110 including a central processing unit (not shown), a read only memory (not shown) and a random access memory (not shown) which are interconnected through a system bus 111; a mass storage device 112; a keyboard 116 and a mouse 118 connected through input interfaces (IFs) 114; a display device 122 and a loudspeaker 124 connected through a video/audio interface 120; and a FD (floppy disc) drive 128 connected through FD interface 126. The video editing system 100 further comprises an optical disc drive 134 which can play a DVD (digital video disc), a video-CD (video-compact disc), a PhotoCD, etc. The optical disc drive 134 is connected to the system bus 111 through a movie and still media resource interfaces 130. The system 100 further includes an MPEG-2 video/audio decoder 138 for converting a coded video and audio data stream from a DVD into a digital video stream and a digital audio stream which are supplied to the video/audio output interfaces 120. The system 100 further comprises a sound board 136 which provides an audio output function in coorperation with a MIDI play program (not shown), a WAVE play program (not shown), or an MPEG-1 audio decoder program (not shown). The video and audio output IFs 120 preferably include an audio digital/analog converter (not shown), a video digital/analog converter (not shown) and an NTSC (National Television Standard Committee) or PAL (Phase Alternation by Line) encoder (not shown) for example.

Figure 2:
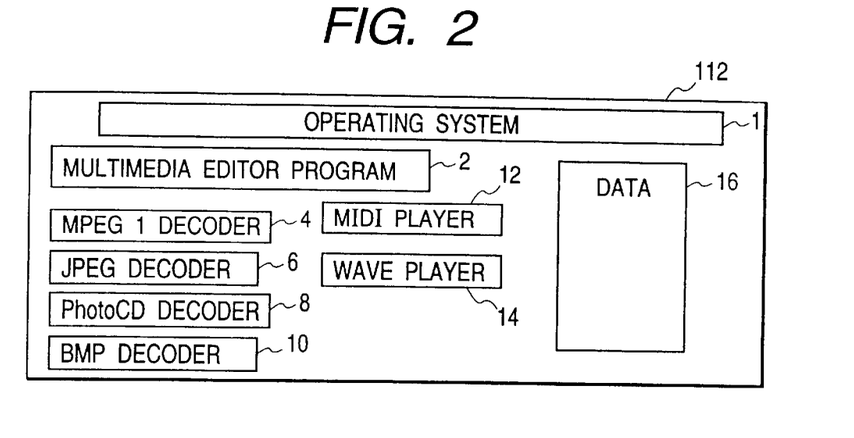
FIG. 2 is a diagram showing exemplary contents of the mass storage device 112 of FIG. 1.

FIG. 2 is a diagram showing exemplary contents of the mass storage device 112 of FIG. 1. The mass storage device 112 stores an operating system 1. The operating system 1 may be any suitable operating system whether it is a tailored or standard one. The storage device 112 stores not only a multimedia editor program 2 according to the embodiment of the invention but also MPEG-1 decoder 4 for moving pictures, JPEG 6, PhotoCD 8 and BMP 10 decoders for still pictures, and MIDI 12 and WAVE 14 players for audio output. This enables the multimedia editing system 100 not only to create a multimedia application but also to play the created application. Also, The storage device 112 stores various data 16 including media materials for use in scenario editing.

Before starting editing a multimedia scenario, the user has to collect and/or prepare media materials, which are expected to be useful for making up the scenario. Then the user creates a material table and registers the collected and/or prepared materials to the material table.

Figure 3:
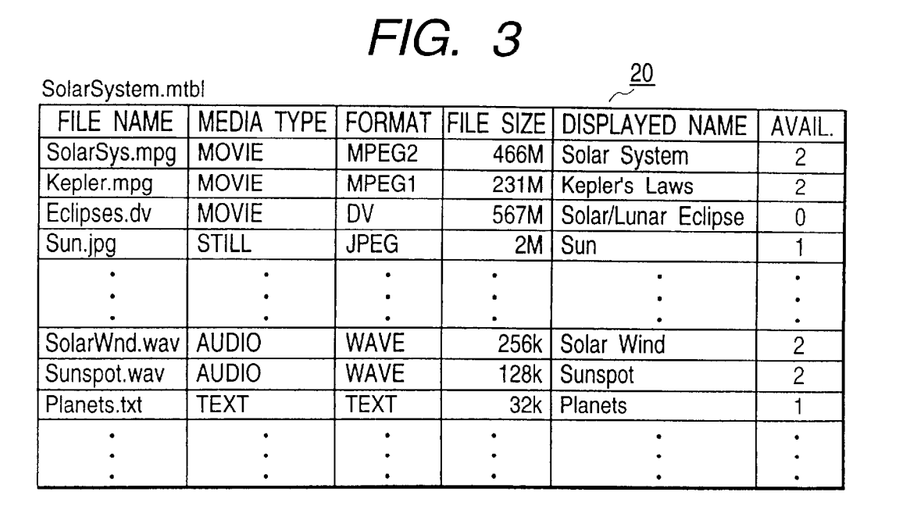
FIG. 3 is a diagram showing an exemplary structure of a material table or file 20 which stores information on the media materials prepared for a certain multimedia title to be created

FIG. 3 is a diagram showing an exemplary structure of a material table or file 20 which stores information on the media materials prepared for a certain multimedia title to be created. Assume that the file name of the material table file 20 is, say, "SolarSystem.mtbl." Each of the records of the material table 20 comprises the fields of FileName which contains a file name of the file that contains the media material, MediaType which contains the type of the media material, Format which contains the format of the media material, FileSize which contains the file size in bytes, and DisplayedName which contains a name which is to be presented to the user as a name of the media material.

For the sake of better understanding the present invention, it is useful to describe the features required for the multimedia editing system 100 to which the principles of the invention are applied.

Figure 4:
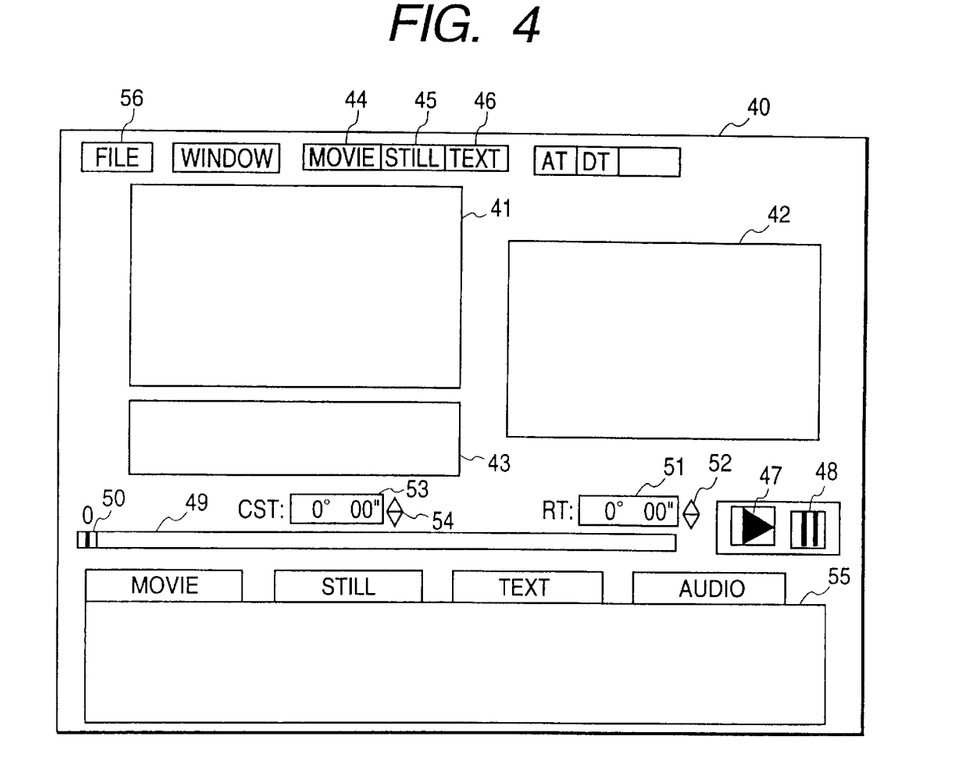
FIG. 4 is a diagram showing an exemplary initial screen displayed when the multimedia editing system 100 is started.

FIG. 4 is a diagram showing an exemplary initial screen displayed when the multimedia editing system 100 is started. There are shown a movie frame 41 for displaying a moving picture material, a still frame 42 for displaying a still picture, and a text frame 43 for displaying a text. Though the material display frames 41 through 43 are automatically set by the system 100 in this specific example, the user may set the frames 41 through 43 by using one of frame setting buttons MOVIE 44, STILL 45 and TEXT 46, and a mouse 118 dragging operation. The screen 40 includes a play button 47 to preview a scenario in course of editing or to play a completed scenario, a stop button 48 to stop previewing or playing the scenario, a scroll bar 49 and scroll box 50 that roughly indicates the running time (RT) of the scenario and the current scenario time (CST) or the current temporal position in scenario by the scroll box 50 moving with the advance of scenario by playing. The user can roughly set the current scenario time (CST) by dragging the scroll box 50. The screen 40 further includes precise indications of RT 51 and CST 53 and respective pairs 52 and 54 of up and down buttons for precise setting RT 51 and CST 53 to desired values. At the bottom of the screen 40, there is a media material display area 55 where available media materials are displayed.

Figure 5:
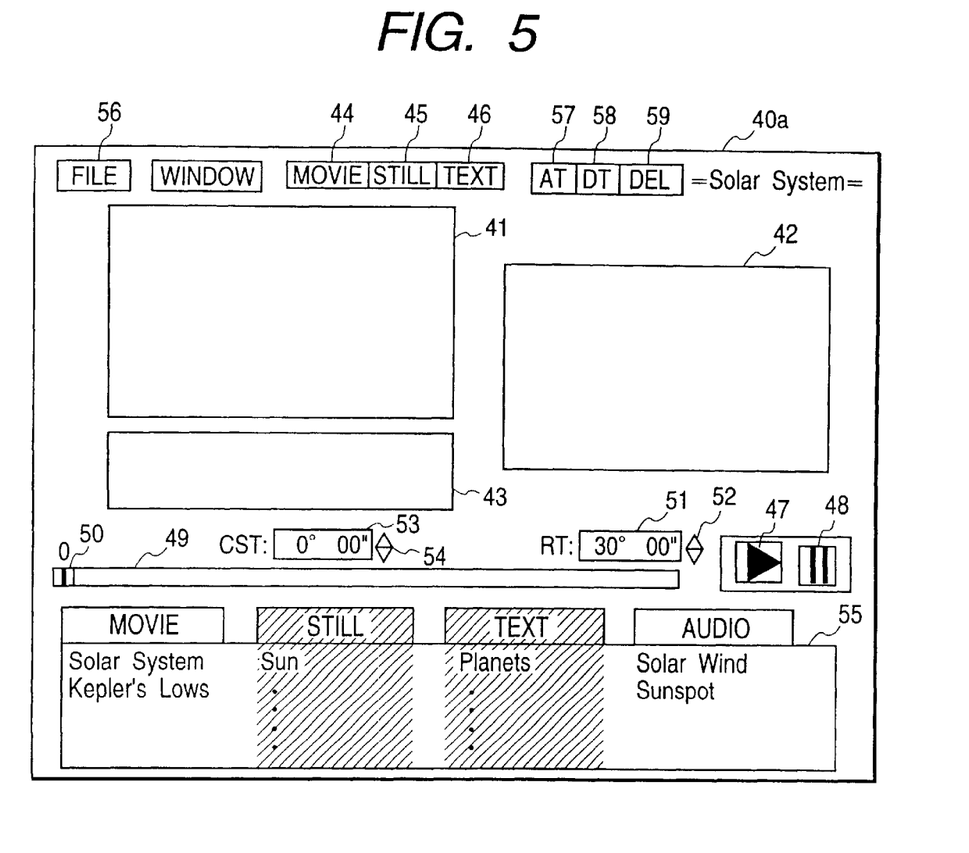
FIG. 5 is a diagram showing an exemplary screen displayed when a multimedia scenario file SolarSystem.scn is opened.

If the user desires to start editing a new scenario by using the above-mentioned material table 20 (SolarSystem.mtbl) or to resume editing a scenario under editing by using the table 20, the user creates or opens a scenario file (detailed later) in the name of, say, SolarSystem.scn through a FILE menu 56. Then, the multimedia editing system 100, i.e., the controller 110 operating under the control of the multimedia editor program 2 refers to the material table SolarSystem-.mtbl 20 and displays available media materials in the media material display area 55 as shown in FIG. 5. In FIG. 5, the running time (RT) 51 has been set to just 30 minutes for example. There is also displayed a title name "SolarSystem" 56 at a top right portion of the screen 40a.

It is assumed that the user follows the following rules in using the presented materials:

(1) Any audio material is attached to a scenario time at which the user desires to start playing the audio material. That is, the user first sets the CST indicator 53 to the desired scenario time either by stopping the previewing of the scenario at the desired time or by dragging the scroll box 50 or clicking on the CST setting button pair 54 till the CST indicator 53 reads the desired scenario time; and clicks on an attach (AT) button 57 while selecting the audio material.

(2) Any visual material or any material of the movie, still or text type is attached to a corresponding frame 41, 42 or 43 at a scenario time at which the user desires to start playing the visual material. That is, the user first sets the CST indicator 53 to the desired scenario time in the same manner as described above; and clicks on the AT button 57 while selecting the visual material.

(3) The movie-type materials and the audio-type materials are separately attached in order of time to be played.

(4) If a material is detached at a certain scenario time, the playing of the material is terminated just before the detached scenario time so that another material of the same material type as that of the material can be attached at the detached scenario time.

We discuss how the multimedia editing system 100, which has the above-described feature, presents or displays media materials in the available media material display area 55 in the following.

Figure 6:
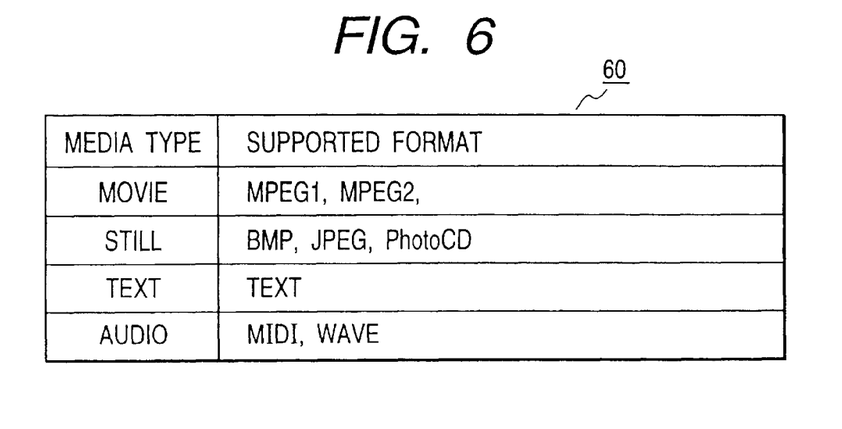
FIG. 6 is a table storing the media formats supported by the multimedia editing system of FIG. 1.

The system 100 displays available media materials in the material display area 55 according to the following principles:

(a) Only materials of the formats which are supported by the system 100 (hereinafter, referred to as "supported-format materials") are displayed. As seen from the above description of the structure of the system 100, the system 100 supports the MPEG-1 and -2 formats for the movie type; the BMP, JPEG and PhotoCD formats for the still type; the text format for the text type; and the MIDI and WAVE formats for the audio type as shown in a supported format table 60 of FIG. 6. The table 60 is stored in the mass storage device 112.

(b) The user is guided into first using a material with the time axis or a material of the movie type or the audio type. In other words, any materials of the still type and the text type can not be used as long as no material is used in the scenario. This is because it can be thought that first establishing a flow of movie materials and audio materials facilitates the subsequent editing process.

(c) Any two formats of the MPEG-1, MIDI and WAVE formats can not be used at the same time because these formats share the same hardware resource, i.e., the sound board 136. Hereinafter, these formats are referred to as board-sharing formats. It is noted that since the materials of the MPEG-2 format are decoded by hardware (i.e., the MPEG-2 decoder 138), the MPEG-2 format and any board-sharing format (or any of the MPEG-1, MIDI and WAVE formats) can be used at the same time.

(d) The materials whose play time are longer than the remaining scenario time are not presented to the user.

(e) The text materials which, if put in the text frame 43, will overflow the text frame 43 are not presented to the user.

(f) An interval of more than three seconds is necessary between one WAVE material and another WAVE material. In other words, if there is a WAVE material at most three second before the current scenario time (CST), then any WAVE materials are not presented to the user.

In order to facilitate the operation of the system 100, the material table 20 preferably includes an availability code (AVAIL.) field. In this specific embodiment, it is assumed that the availability code of 0 indicates that the material is not supported in format (and accordingly referred to as "a format-unsupported material). The availability code of 1 indicates that the material is supported in format but not available due to any of the above-described restrictions (and accordingly referred to as "an unavailable material). The availability code of 2 indicates that the material is supported in format and available without being subjected to any of the above-described restrictions (and accordingly referred to as "an available material). The availability code of each material is automatically stored in the AVAIL. field by the system 100 when the material is registered by the user.

Figure 7:
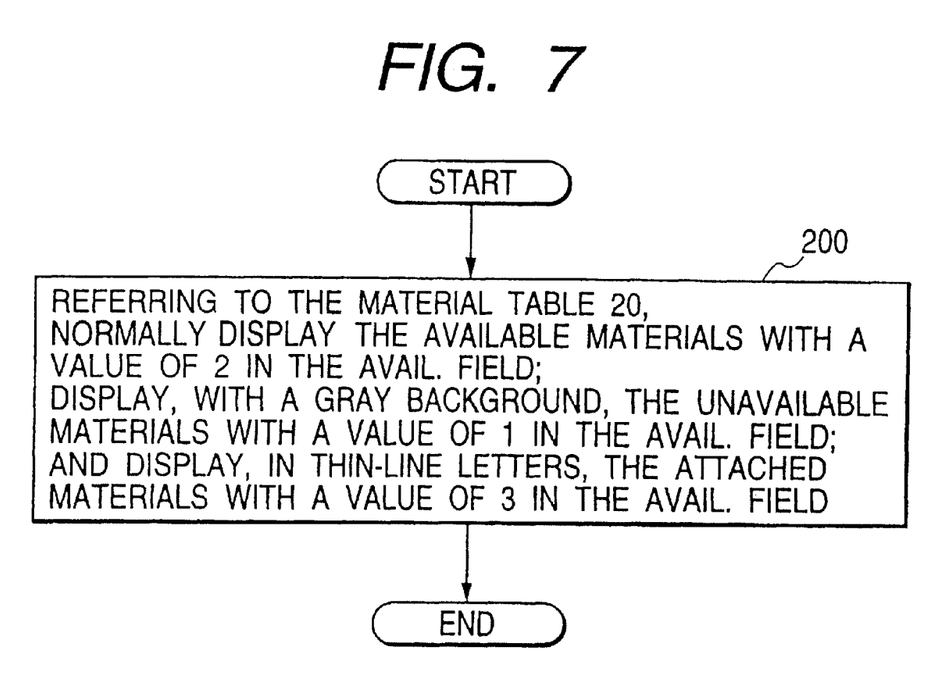
FIG. 7 is a flowchart showing an exemplary available material display operation executed by controller 110 under the control of the multimedia editor program 2 when the scenario file is created or opened.

FIG. 7 is a flowchart showing an exemplary available material display operation executed by controller 110 under the control of the multimedia editor program 2 when the scenario file (SolarSyatem.scn in this example) is created or opened.

According to the principles of the invention, the format-unsupported materials are not displayed in the available media material display area 55. For this reason, a movie material of the DV format which is not supported by the system 100 with a file name "Eclipses.dv" (the AVAIL. field has a value of 0) is not displayed in the screen 40*a* of FIG. 5. The available materials, the AVAIL. fields of which contain a value of 2, are displayed normally as shown in the columns "MOVIE" and "AUDIO" of the screen 40*a* of FIG. 5. The unavailable materials, the AVAIL. fields of which contain a value of 1, are displayed otherwise, e.g., with a gray background (expressed by slant lines) as shown in the columns "STILL" and "TEXT" of the screen 40*a* of FIG. 5. It is noted that the availability code of 3 indicates that the material has been already attached. These display operations are performed in step 200.

The availability of materials may be affected by attaching, detaching or deleting a material, or changing the text frame size or the CST due to above-described restrictions (b) through (f) as shown in the following table.

TABLE

| | Attach | Detach | Delete | Change of text frame size | Change of CST |
|---|---|---|---|---|---|
| (b) | | | x | | |
| (c) | x | x | x | | |
| (d) | x | x | x | | x |
| (e) | | | | x | |
| (f) | | x | x | | x |

(x: The availability is affected.)

Then, we discuss the changes in availability in case of attaching, detaching and deleting a material, and changing the text frame size and the CST in the following.

Figure 8:
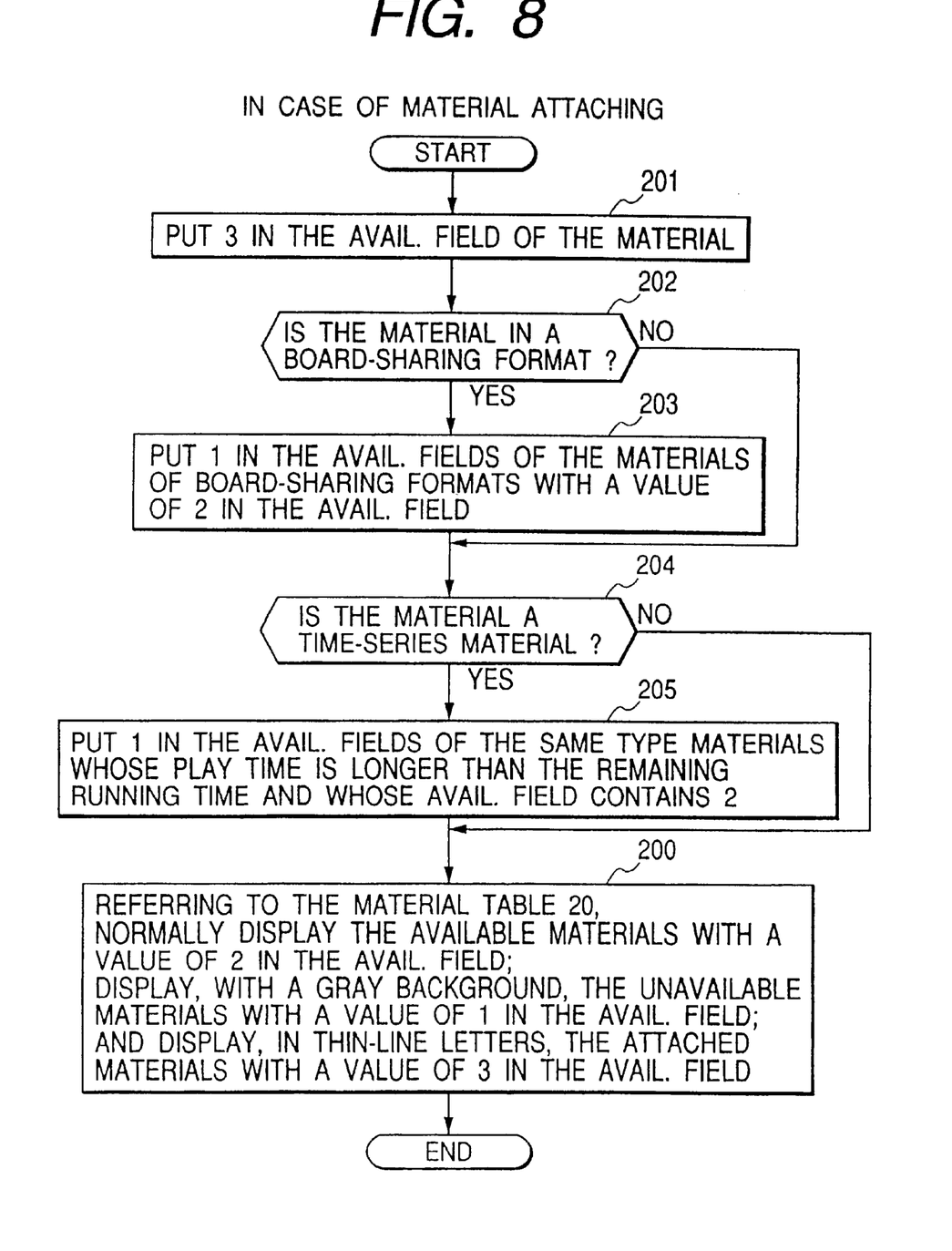
FIG. 8 is a flowchart showing an exemplary available material display operation executed when a material is attached.

FIG. 8 is a flowchart showing an exemplary available material display operation executed when a material is attached. In step 201, controller 110 changes the value of the avail. field of the attached material from 2 to 3. In step 202, controller 110 makes a test to see if the attached material is of a board-sharing format. If so, controller 110 puts a value of 1 in the avail. fields of the materials of board-sharing formats with a value of 2 in the avail. field in step 203 and proceeds to step 204. Otherwise, controller 110 proceeds to step 204. In step 204, controller makes a test to see if the material is a time-series material, i.e., if the material is of the movie type or the audio type. If so, then controller 110 puts 1 in the avail. fields of the same type materials whose play time is longer than the remaining running time and whose avail. field contains 2 in step 205 and proceeds to step 200. For this purpose, it is preferable to include a play time field (not shown) in the media material table 20. If the test result is NO in step 204, controller 110 proceeds to step 200. In step 200, controller 110 displays the available, the unavailable, and the attached materials in the normal way, with a gray background and in thin-line characters, respectively as described in connection with FIG. 7.

Figure 9:
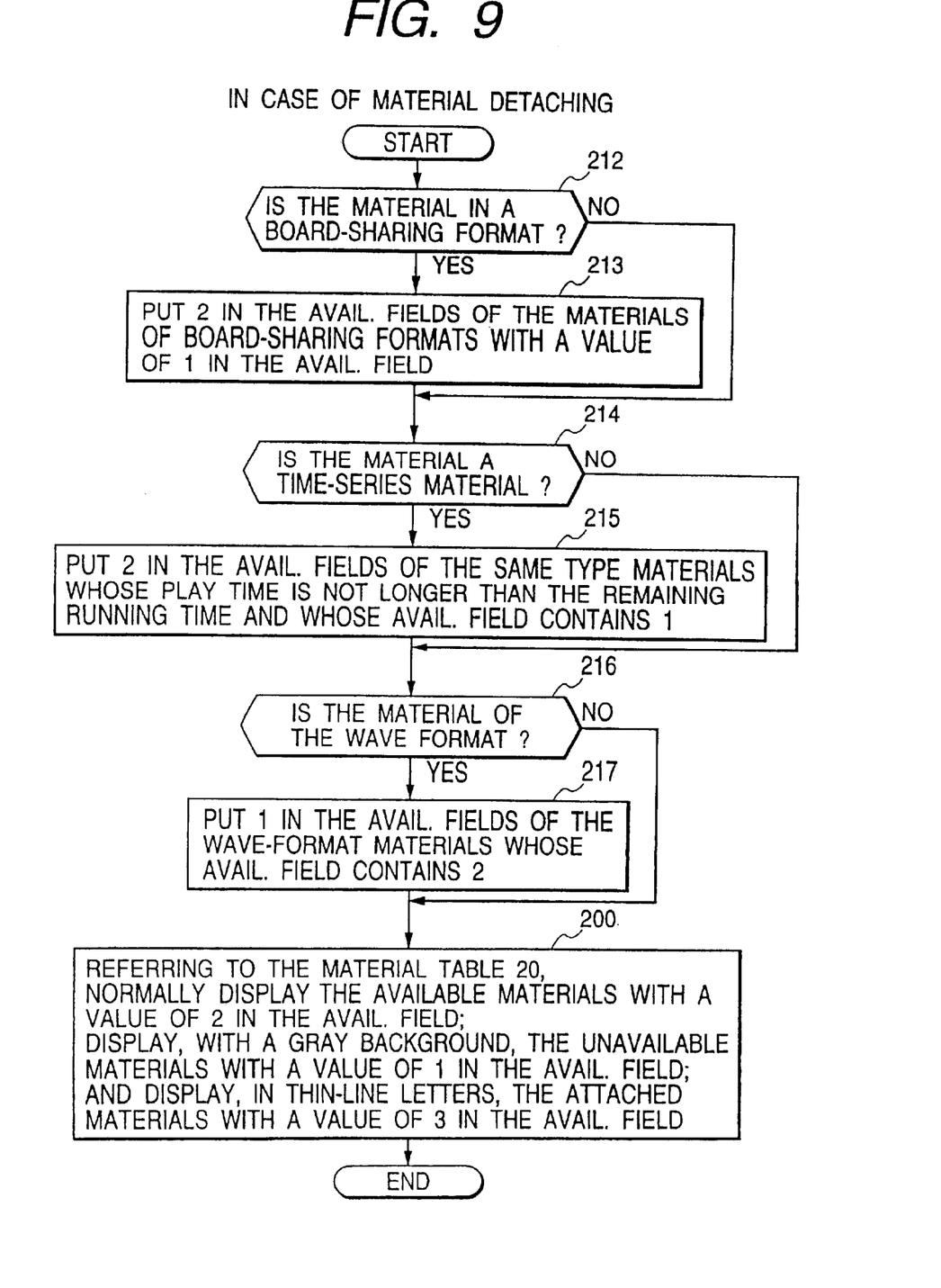
FIG. 9 is a flowchart showing an exemplary available material display operation executed when an attached material is detached.

FIG. 9 is a flowchart showing an exemplary available material display operation executed when an attached material is detached. In step 212, controller 110 makes a test to see if the attached material is of a board-sharing format. If so, controller 110 puts a value of 2 in the avail. fields of the materials of board-sharing formats with a value of 1 in the avail. field in step 213 and proceeds to step 214. Otherwise, controller 110 proceeds to step 214. In step 214, controller 110 makes a test to see if the material is a time-series material, i.e., if the material is of the movie type or the audio type. If so, then controller 110 puts 2 in the avail. fields of the same type materials whose play time is not longer than the remaining running time and whose avail. field contains 1 in step 215 and proceeds to step 216. If the test result is NO in step 214, controller 110 proceeds to step 216. In step 216, controller 110 makes a test to see if the detached material is of the wave format. If so, then controller 110 puts 1 in the avail. fields of the wave-format materials whose avail. field contains a value of 2 in step 217 and proceeds to step 200. Otherwise, controller 110 proceeds to step 200. In step 200, controller 110 displays the available, the unavailable, and the attached materials in the normal way, with a gray background and in thin-line characters, respectively as described in connection with FIG. 7.

Figure 10A:
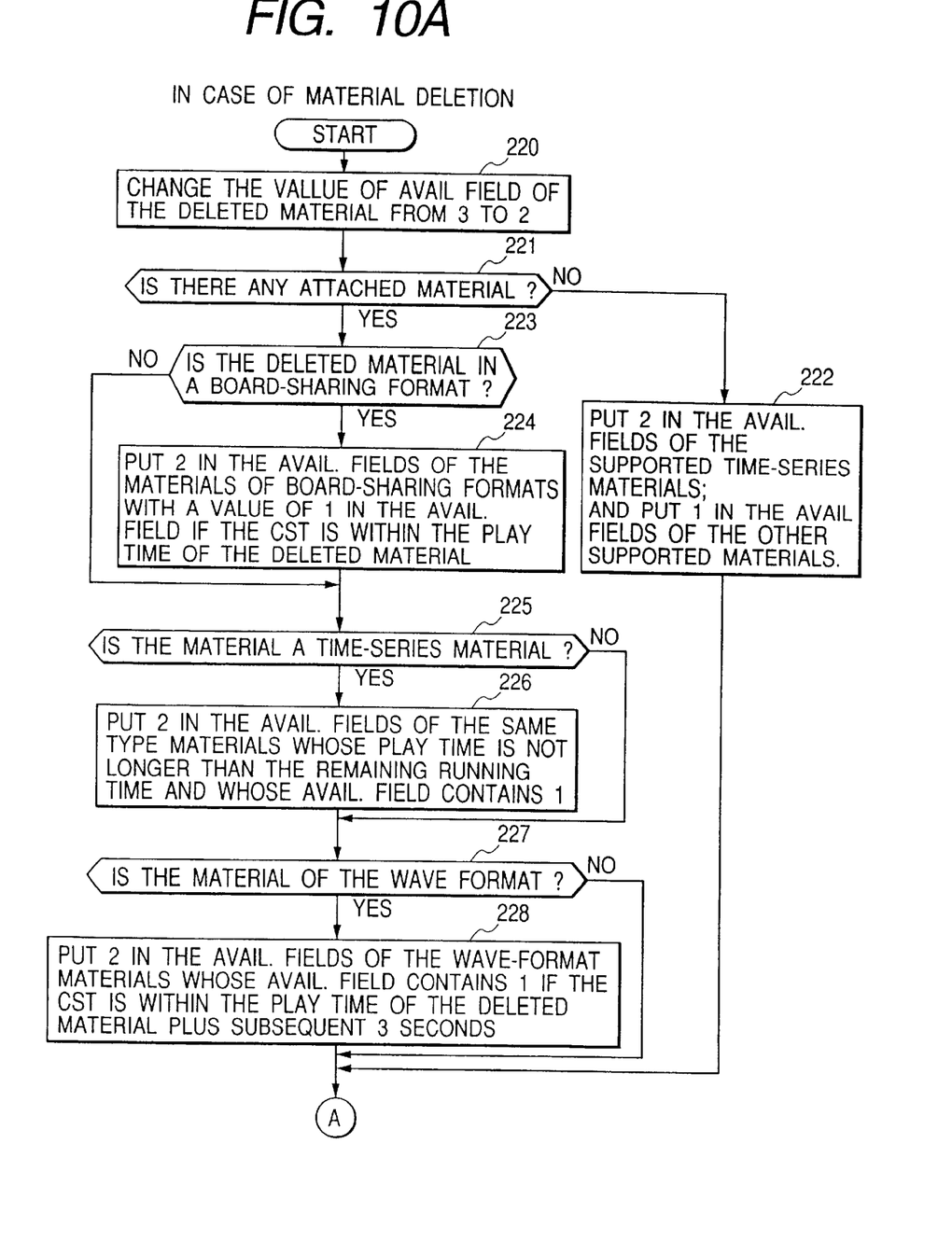
FIGS. 10A and 10B, when combined together at the point denoted with a encircled letter "A," constitute a flowchart showing an exemplary available material display operation executed when an attached material is deleted.
Figure 10B:
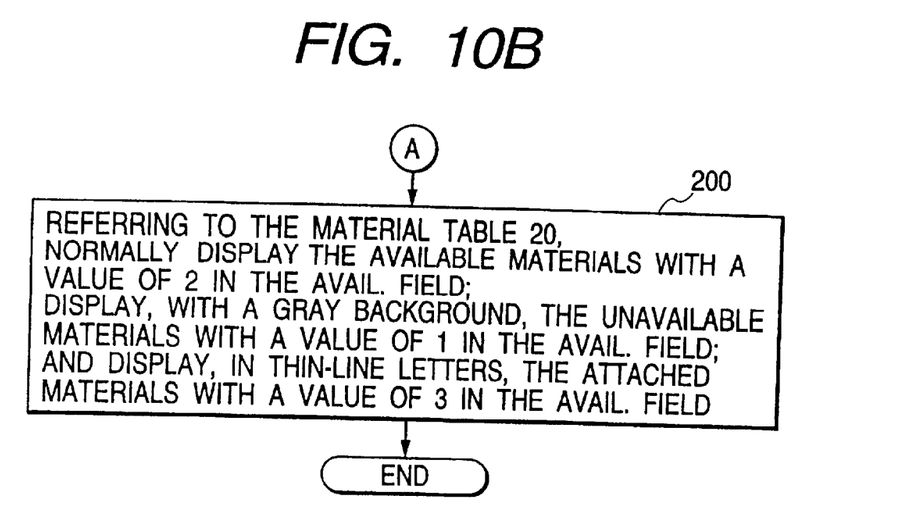

FIGS. 10A and 10B, when combined together at the point denoted with a encircled letter "A," constitute a flowchart showing an exemplary available material display operation executed when an attached material is deleted. In step 220, controller 110 changes the value of the AVAIL. field of the deleted material from 3 to 2. In step 221, controller 110 makes a test to see if there is any attached material. If not, then controller 110 puts 2 in the AVAIL. fields of the supported time-series materials; and puts 1 in the AVAIL. fields of the other supported materials in step 222 and proceeds to step 200. If the test result is YES in decision step 221, controller 110 makes a test in step 223 to see if the deleted material is of a board-sharing format. If so, controller 110 puts a value of 2 in the avail. fields of the materials of board-sharing formats with a value of 1 in the avail. field in step 224 and proceeds to step 225. Otherwise, controller 110 proceeds to step 225. In step 225, controller 110 makes a test to see if the deleted material is a time-series material, i.e., if the material is of the movie type or the audio type. If so, then controller 110 puts 2 in the avail. fields of the same type materials whose play time is not longer than the remaining running time and whose avail. field contains 1 in step 226 and proceeds to step 227. If the test result is NO in step 225, controller 110 proceeds to step 227. In step 227, controller 110 makes a test to see if the deleted material is of the wave format. If so, then controller 110 puts 2 in the avail. fields of the wave-format materials whose avail. field contains a value of 1 in step 228 and proceeds to step 200. Otherwise, controller 110 proceeds to step 200. In step 200, controller 110 again displays the available, the unavailable, and the attached materials in the normal way, with a gray background and in thin-line characters, respectively as described in connection with FIG. 7.

Figure 11:
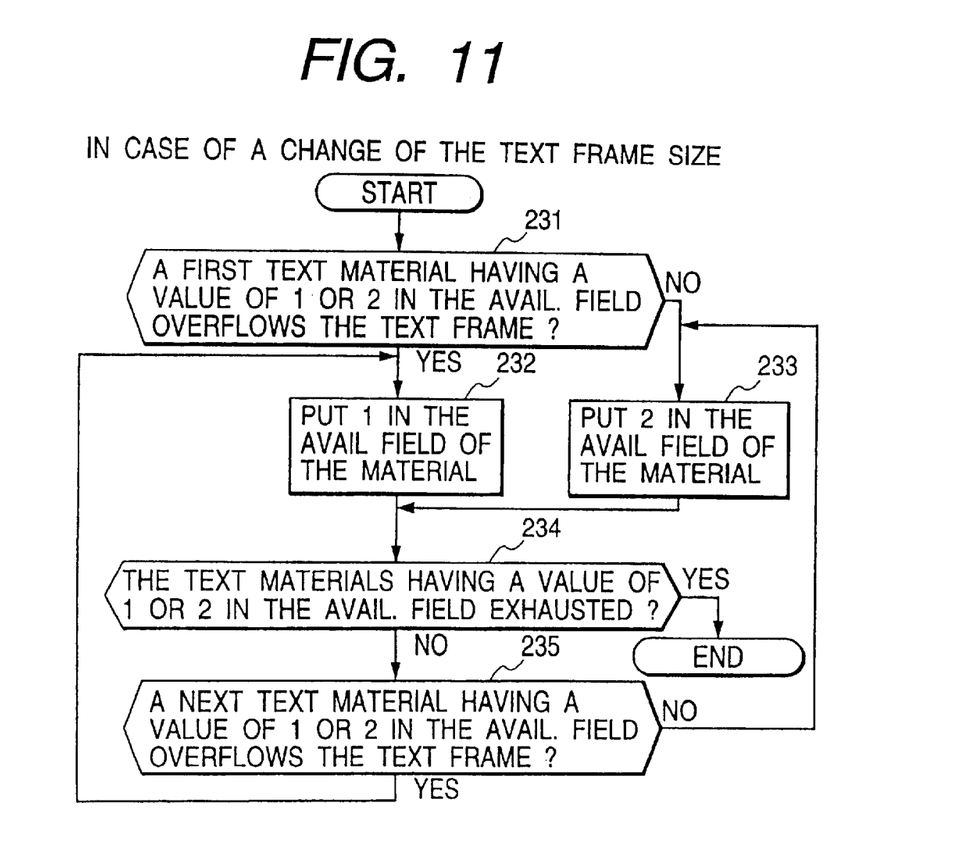
FIG. 11 is a flowchart showing an exemplary available material display operation executed when the size of a text frame is changed.

FIG. 11 is a flowchart showing an exemplary available material display operation executed when the size of a text frame is changed. In step 231, controller 110 makes a test to see if a first text material that has a value of 1 or 2 in the AVAIL. field will overflow the text frame which has been changed in size if the material is put in the frame. If so, controller 110 puts 1 in the AVAIL. field of the frame in step 232. Otherwise, controller 110 puts 2 in the AVAIL. field of the frame in step 233. After step 232 or 233, controller 110 proceeds to step 234, where controller 110 makes a test to see if the text materials that have a value of 1 or 2 in the AVAIL. field have been exhausted. If not, then controller 110 makes another test in step 235 to see if a next text material that has a value of 1 or 2 in the AVAIL. field will overflow the text frame that has been changed in size if the material is put in the frame. If so, controller proceeds to step 232, otherwise proceeds to step 233. If the test result is YES in decision step 234, then controller 110 ends the operation.

Figure 12:
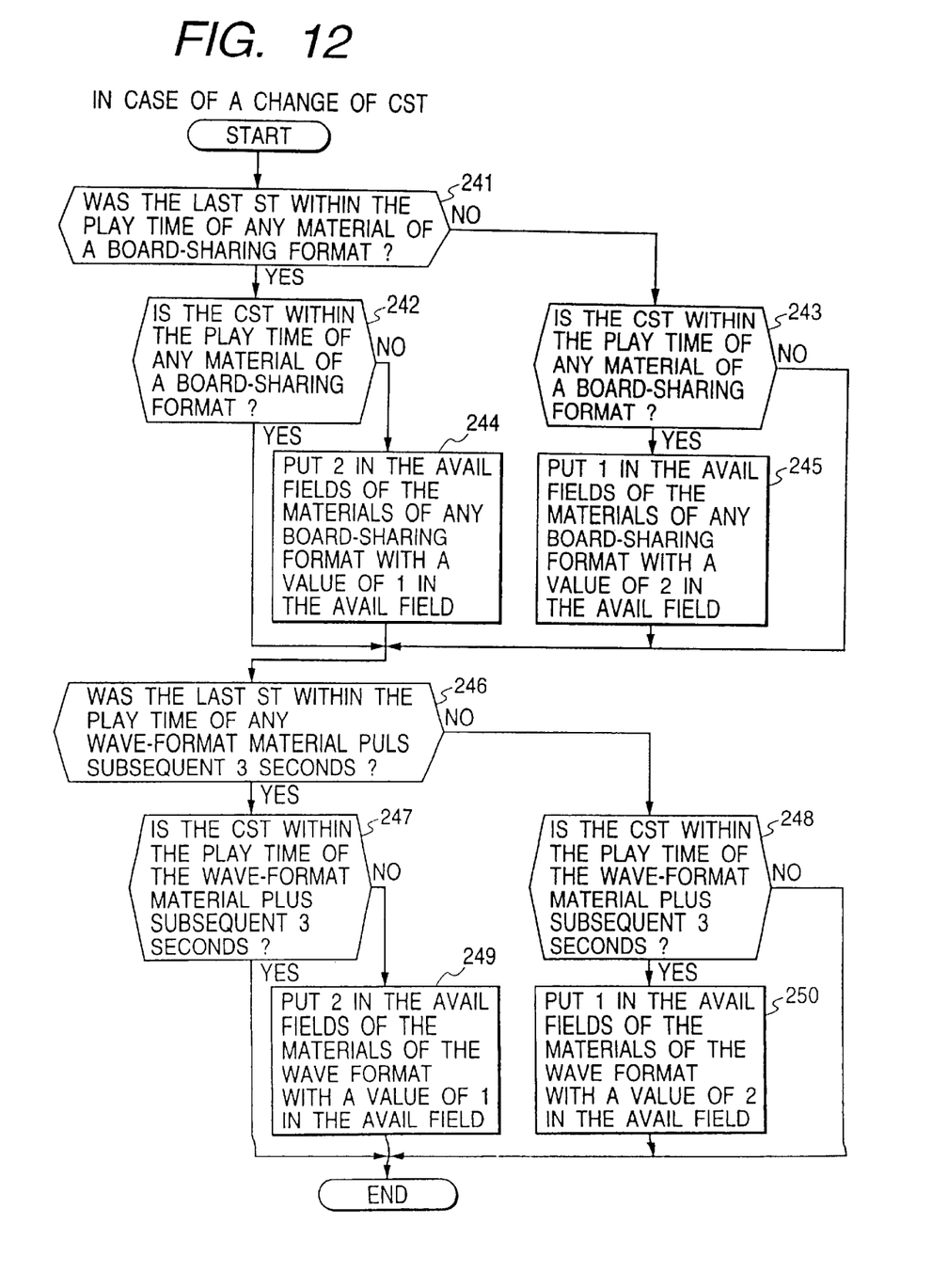
FIG. 12 is a flowchart showing an exemplary available material display operation executed when the current scenario time is changed.

FIG. 12 is a flowchart showing an exemplary available material display operation executed when the current scenario time is changed. In step 241, controller 110 makes a test to see if the last scenario time (ST) was within the playtime of any material of a board-sharing format. If so, a test is made in step 242 to see if the CST is within the playtime of any material of a board-sharing format. If so, controller 110 proceeds to step 246. Otherwise in step 242, controller 110 puts 2 in the AVAIL. fields of the materials of any board-sharing format with a value of 1 in the AVAIL. field in step 244 and proceeds to step 246.

If the test result is NO in step 241, then controller 110 makes a test in step 243 to see if the CST is within the play time of any material of a board-sharing format. If so, controller 110 puts 1 in the avail. fields of the materials of any board-sharing format with a value of 2 in the avail. field in step 245 and proceeds to step 246. Otherwise, controller 110 proceeds to the step 246.

In step 246, controller 110 makes a test to see if the last scenario time was within the play time of any wave-format material plus subsequent 3 seconds. If so, controller 110 makes a test in step 247 to see if the CST is within the play time of any wave-format material plus subsequent 3 seconds. If not, controller 110 puts 2 in the AVAIL. fields of the materials of the WAVE format with a value of 1 in the avail. field in step 249 and ends the operation.

If the test result is NO in step 246, controller 110 makes a test in step 248 to see if the CST is within the play time of any wave-format material plus subsequent 3 seconds. If so, controller 110 puts 1 in the AVAIL. fields of the materials of the WAVE format with a value of 2 in the avail. field in step 250 and ends the operation. Otherwise, controller 110 ends the operation.

Thus, the available materials, the unavailable materials, and the attached materials are displayed in different manners each time of the operations of attaching, detaching and deleting a material, and changing the text frame size and the CST. This facilitates the user's editing operation.

Figure 13:
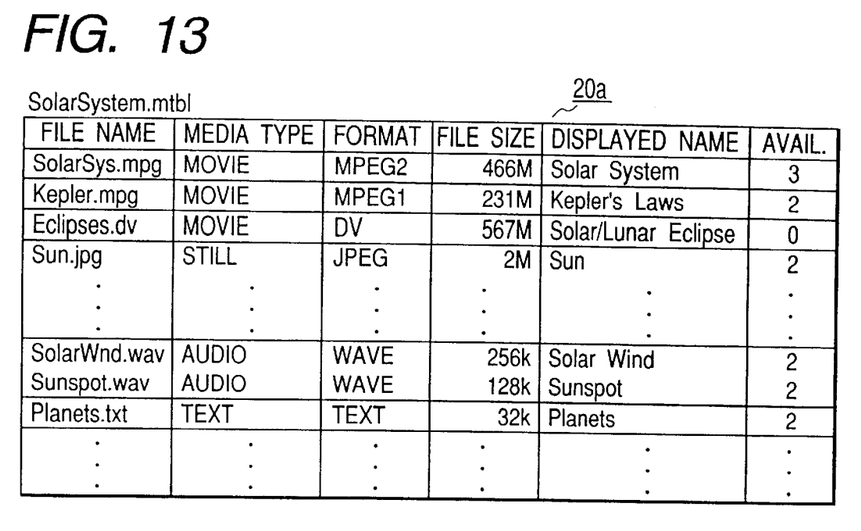
FIGS. 13 and 14 shows a material table 20a and a displayed screen 40b, respectively, when the user has attached a material SolarSys.mpg to the movie frame 41 at the scenario time of 0° 00".
Figure 14:
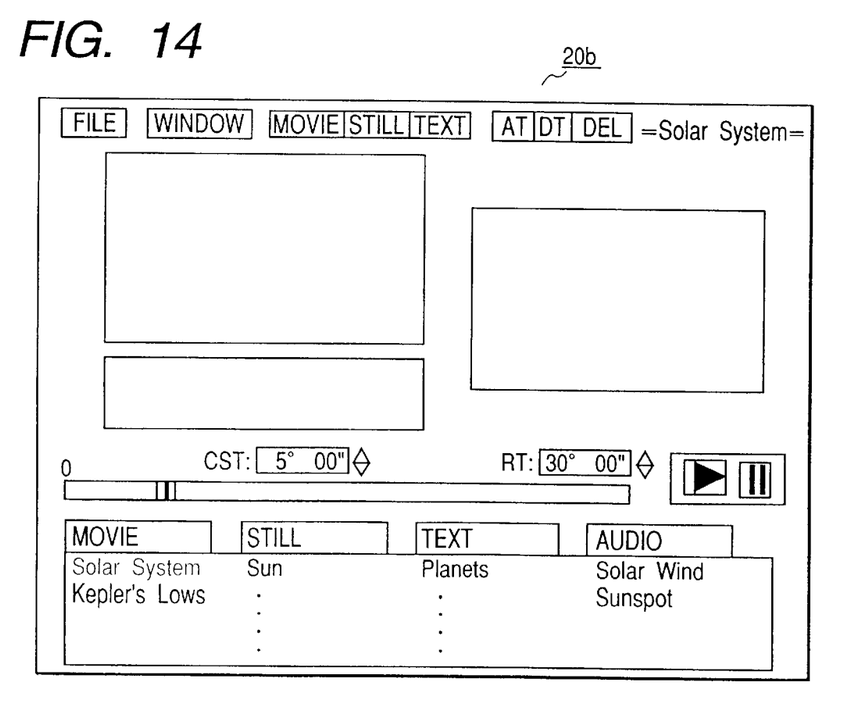

For example, if we assume that the user has attached a material whose file name is SolarSys.mpg to the movie frame 41 at the scenario time of 0° 00"; the play time of the material SolarSys.mpg is just 5 minutes; and the user has subsequently changed the CST to 5° 00" in scenario time, then the material table 20 and the displayed screen 40a becomes as shown in FIGS. 13 and 14, respectively. In FIG. 13, since the material SolarSys.mpg has been attached, the AVAIL. field of the material SolarSys.mpg has changed from 2 to 3. Also, since the user has changed the CST to 5° 00" in scenario time, the AVAIL. fields of the supported materials except SolarSys.mpg has changed to 2, which means that these materials are available. Responsively, in FIG. 14, the movie material "Solar System" is shown in thin-line characters, i.e., displayed in a gray level. The other materials are shown normally.

The foregoing merely illustrates the principles of the invention. Though unavailable materials are shown with a gray background in the above-described illustrative embodiment, they may be displayed in any suitable manner, e.g., they may be displayed under-lined.

In attaching a material of any visual type such as a movie, still or text type, the user first specifies the material type of desired material, for example, by clicking on a frame of the material type. In this case, it is preferable to display the specified frame and available materials of the specified type in a special color.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of presenting to a user only media materials permitted to situations at a current time in a scenario under editing (hereinafter referred to as "current scenario time") to facilitate a selection of media material in a system for editing the scenario that defines details of a multimedia application, wherein the media materials are divided into a plurality of types and wherein each of the types may have at least one format, a part of the at least one format being supported by the system and hereinafter referred to as "supported formats", the method comprising the steps of:

storing a material record that associates each media material with a type, a format and an availability code of said each material, said availability code indicating one of predetermined states of said each material;

in response to a change in one of situations that affects an availability of any material of a certain type and/or a certain format, updating said availability code of each material affected by said change such that said availability code of said each material reflects a current state of said each material; and displaying media materials of said supported formats in different ways associated with said predetermined states according to said availability code of said materials.

2. A method as defined in claim 1, wherein said availability code of each material takes one of at least first, second and third values, said first value indicating that said material is unavailable, said second value indicating that said material is available, and said third value indicating that said material has been attached to a scenario time.

3. A method as defined in claim 2, further comprising the step, executed prior to the user using a first material, of setting said availability code of media materials of time-series types to said second value.

4. A method as defined in claim 1, wherein said step of updating said availability code includes the step of setting availability codes of media materials of resource-sharing types such that there exists no moment when any two of said media materials of resource-sharing types are attached.

5. A method as defined in claim 2, wherein said step of updating said availability code includes the step of setting said availability codes of only media materials of time-series types which materials are shorter in play time than a remaining scenario time to said second value.

6. A method as defined in claim 2, wherein said step of updating said availability code includes the step of setting said availability codes of only media materials of a text type which materials are not longer in length than a frame where said media materials are to be displayed to said second value.

7. A method as defined in claim 1, wherein said step of updating said availability code includes the step of setting availability codes of media materials of a WAVE type such that any two of attached media materials of said WAVE type are separated by at least three seconds.

8. A method as defined in claim 1, wherein said step of displaying media materials of said supported formats in different ways includes the step of displaying with a gray background.

9. A method as defined in claim 1, wherein said step of displaying media materials of said supported formats in different ways includes the step of displaying in a gray level.

10. A system, for use in a multimedia editor for editing a scenario that defines details of a multimedia application, for presenting to a user only media materials permitted to situations at a current time in a scenario under editing (hereinafter referred to as "current scenario time") to facilitate a selection of media material, wherein the media materials are divided into a plurality of types and wherein each of the types may have at least one format, a part of the at least one format being supported by the multimedia editor and hereinafter referred to as "supported formats", the system comprising:

means for storing a material record that associates each media material with a type, a format and an availability code of said each material, said availability code indicating one of predetermined states of said each material;

means, responsive to a change in one of situations that affects an availability of any material of a certain type and/or a certain format, for updating said availability code of each material affected by said change such that said availability code of said each material reflects a current state of said each material; and means for displaying media materials of said supported formats in different ways associated with said predetermined states according to said current state of said materials.

11. A system as defined in claim 10, wherein said availability code of each material takes one of at least first, second and third values, said first value indicating that said material is unavailable, said second value indicating that said material is available, and said third value indicating that said material has been attached to a scenario time.

12. A system as defined in claim 11, further comprising means, activated prior to the user using a first material, for setting said availability code of media materials of time-series types to said second value.

13. A system as defined in claim 10, wherein said means for updating said availability code includes means for setting said availability codes of media materials of resource-sharing types such that there exists no moment when any two of said media materials of resource-sharing types are attached.

14. A system as defined in claim 11, wherein said means for updating said availability code includes means for setting said availability codes of only media materials of time-series types which materials are shorter in play time than a remaining scenario time to said second value.

15. A system as defined in claim 11, wherein said means for updating said availability code includes means for setting said availability codes of only media materials of a text type which materials are not longer in length than a frame where said media materials are to be displayed to said second value.

16. A system as defined in claim 10, wherein said means for updating said availability code includes means for setting availability codes of media materials of a WAVE type such that any two of attached media materials of said WAVE type are separated by at least three seconds.

17. A system as defined in claim 10, wherein said means for displaying media materials of said supported formats in different ways includes means for displaying with a gray background.

18. A system as defined in claim 10, wherein said means for displaying media materials of said supported formats in different ways includes means for displaying in a gray level.

19. A multimedia editing and presentation system capable of presenting to a user only media materials permitted to situations at a current time in a scenario under editing (hereinafter referred to as a "current scenario time") to facilitate a selection of media material, wherein the media materials are divided into a plurality of types and wherein each of the types may have at least one format, a part of the at least one format being supported by the multimedia editor and hereinafter referred to as "supported formats", the system comprising:

means for permitting the user to set said current scenario time to a desired scenario time;

means for defining frames in which materials of visual types are presented;

means for permitting the user to edit said scenario by attaching a desired material to at least said current scenario time, detaching and deleting one of attached materials; and means for playing said scenario; said means for permitting the user to edit said scenario comprising:

means for storing a material record that associates each media material with a type, a format and an availability code of said each material, said availability code indicating one of predetermined states of said each material;

means, responsive to a change in one of situations that affects an availability of any material of a certain type and/or a certain format, for updating said availability code of each material affected by said change such that said availability code of said each material reflects a current state of said each material; and means for displaying media materials of said supported formats in different ways associated with said predetermined states according to said current state of said materials.

\* \* \* \* \*